UNITED STATES PATENT OFFICE.

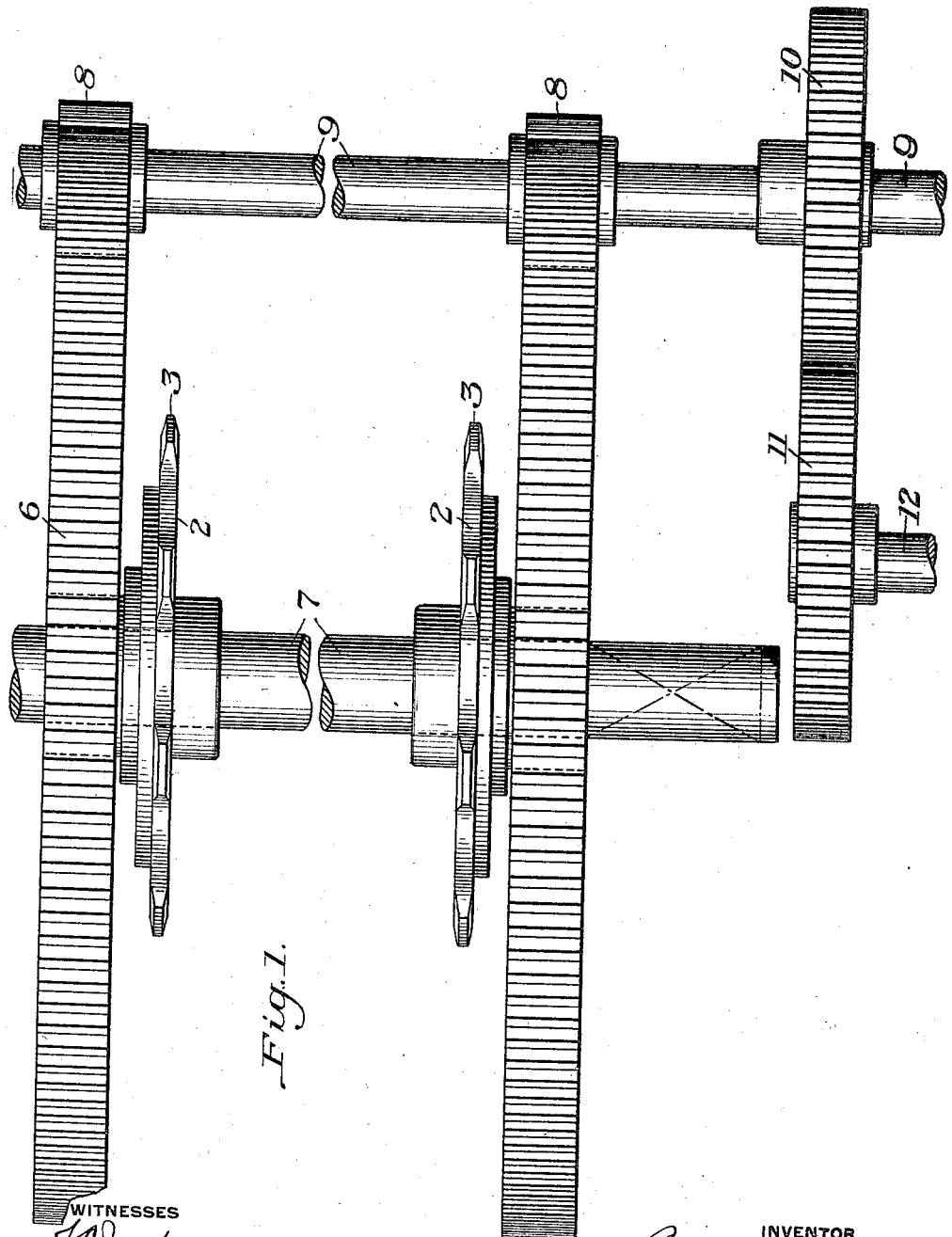

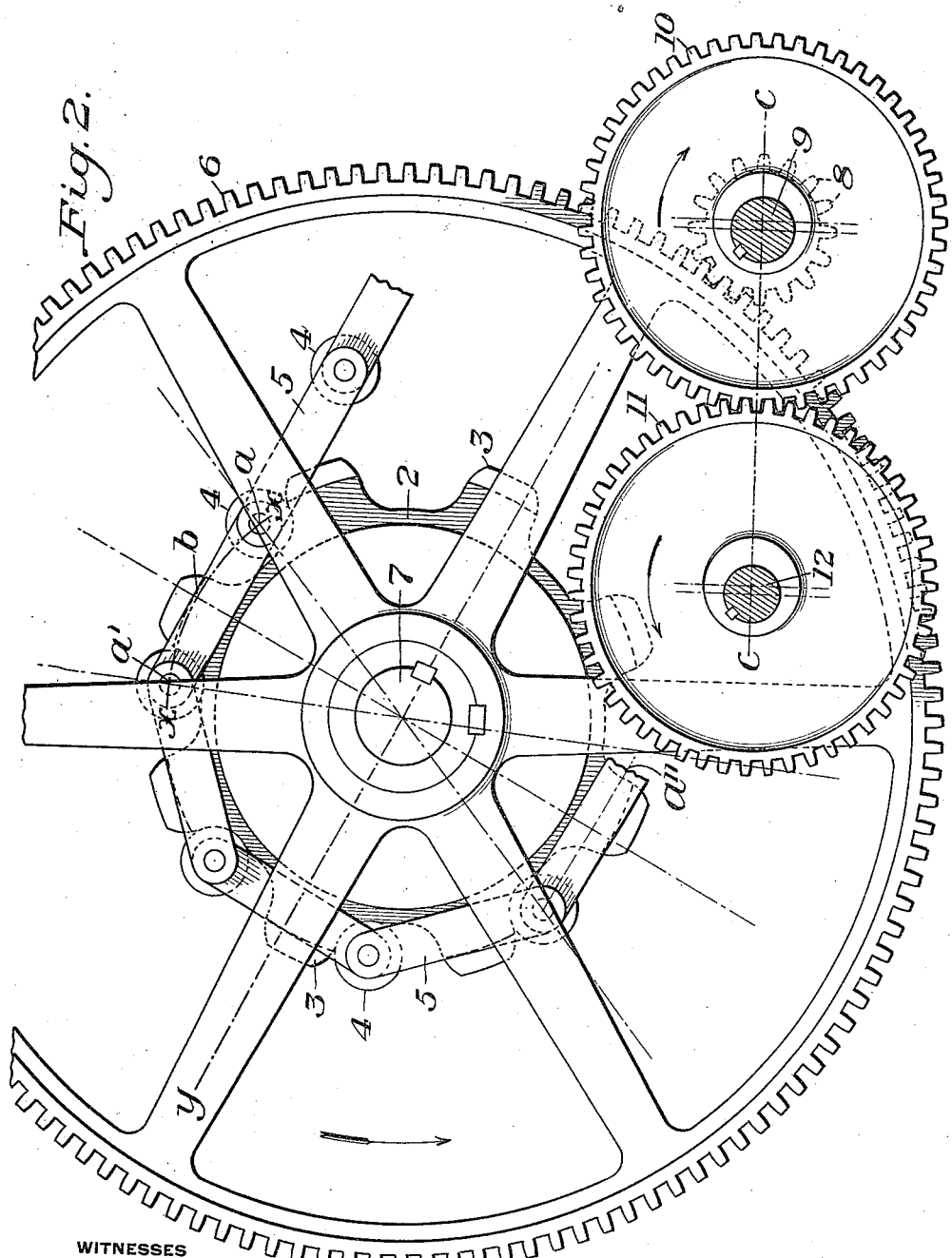

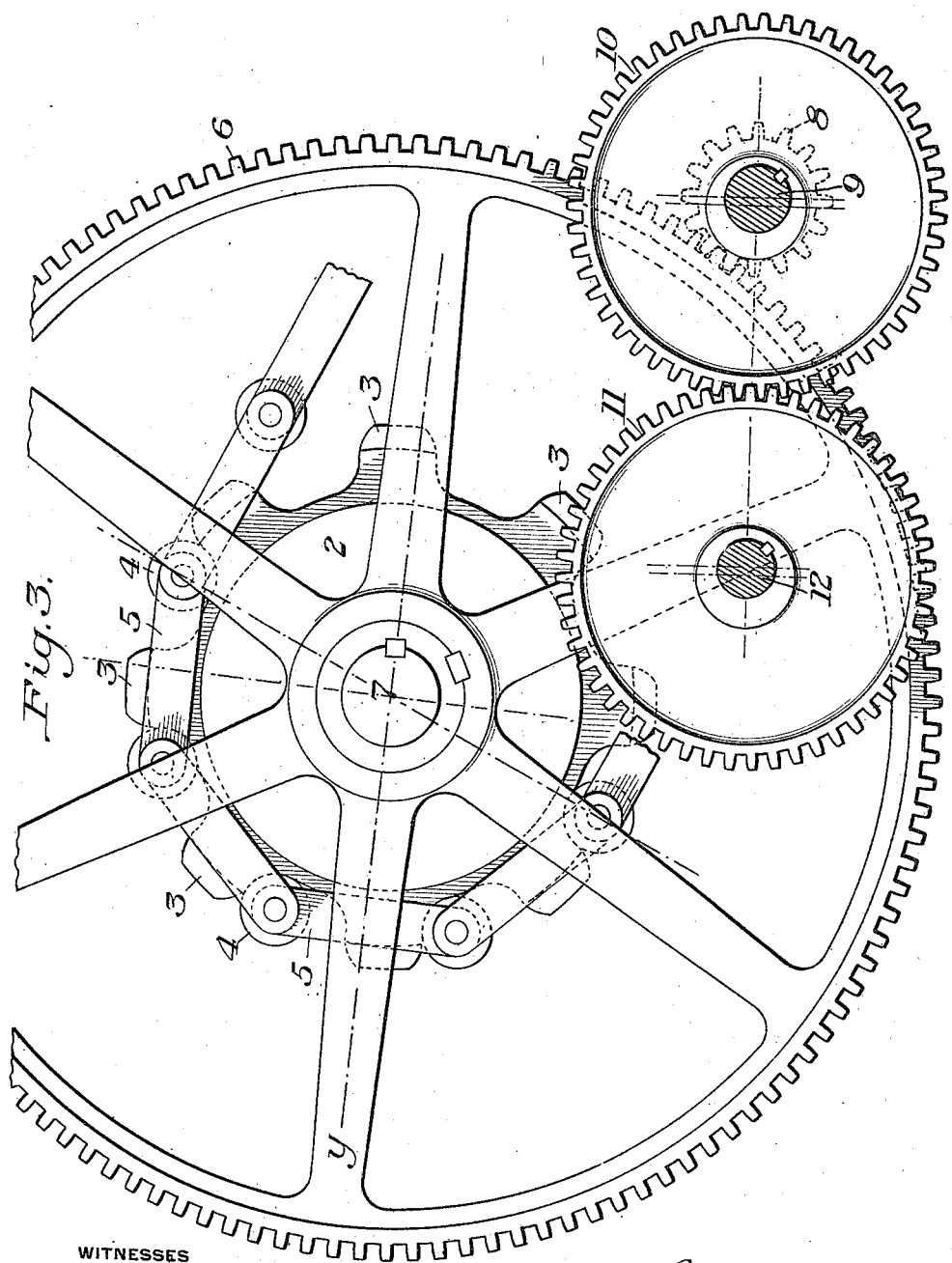

CARL L. KENNEY, OF PITTSBURGH, PENNSYLVANIA, ASSIGNOR TO PITTSBURGH COAL WASHER COMPANY, OF PITTSBURGH, PENNSYLVANIA, A CORPORATION OF PENNSYLVANIA.

GEARING.

1,307,202.  Specification of Letters Patent.  Patented June 17, 1919.

Application filed June 15, 1918. Serial No. 240,151.

*To all whom it may concern:*

Be it known that I, CARL L. KENNEY, a citizen of the United States, residing at Pittsburgh, in the county of Allegheny and State of Pennsylvania, have invented certain new and useful Improvements in Gearings, of which the following is a specification.

My invention consists of an improvement in gearing, and is especially applicable to use with sprocket gearing and chains of large size links and in connection with heavy loads, as in the use of bucket or conveyer chains.

In ordinary driving of such conveyer chains, there is a momentary acceleration of the chain at each tooth engagement because such tooth of the sprocket wheel engages the chain prior to arriving at its right angled position to the line of pull, at which point it is at its greatest relative speed. In sprocket wheels and chains of large size and pitch, say 18 inch to 24 inch, adapted for heavy loads this results in a series of undesirable accelerations with attendant severe strains for each successive tooth engagement, with corresponding wear or possible rupture of the chain. In any event, the action is necessarily irregular because of the continuous momentary acceleration and slowing of the chain between each successive tooth engagement, due to the alternate accelerating and diminishing travel as each joint of the straight chain, when engaged by the tooth, passes from a minimum distance from the center line between the strands to a maximum distance in arriving at the crown of the wheel during the first half pitch movement; and from such maximum distance to a corresponding minimum distance at the other side, during the last half pitch movement.

This operation is repeated each time a new link is engaged, resulting in a continuous jerk and backlash which is transmitted through the entire pulling strand portion of the chain.

I avoid this undesirable result by imparting to the sprocket shaft, through the gear thereon and its driving pinion, a series of variable speed pitch movements from minimum to maximum and back to minimum, the number of such movements in an entire revolution corresponding to the number of sprocket teeth of the driving wheel. By this means, comprising specifically a pair of eccentrically mounted gears for driving the pinion shaft whereby the speed of the driving pinion is correspondingly varied, I impart to each joint of the chain as it leads onto the driving sprocket, a compensating retardation and acceleration whereby the pulling action of the sprocket is regulated during the initial sprocket engagement of each tooth throughout one pitch movement, or until the next tooth comes into engagement, such action being continuous during the operation of the gearing.

Referring to the drawings:

Figure 1 is a general plan view, partly broken away, showing a pair of sprocket wheels and their associated shafting and gearing.

Fig. 2 is a view of the same in elevation showing the sprocket wheel with its leading-in tooth engaging the chain at maximum peripheral speed.

Fig. 3 is a similar view showing the sprocket wheel at a position corresponding to one half of its peripheral pitch travel and at minimum speed, with the actuating gearing in corresponding position.

In the drawings 2, 2, are the driving sprocket wheels of ordinary construction having sprocket teeth 3 and the usual intervening rounded recesses adapted to engage the usual rollers 4 of the chains. As the sprocket wheels rotate, each tooth 3 comes into engagement with roller 4, or with a corresponding pivoting cross member connecting adjacent links, when the roller or joint is at its innermost position toward the center line $y$ of the head and tail sprockets, as at $a$, Fig. 2.

The roller 4 and its pivotal joint bearing between adjacent links 5 then travels with the sprocket wheel around the center thereof on the annular pitch line periphery of the sprocket $x$, $x$, continuously until released from the sprocket at its opposite under side. During such movement the pivotal bearing moves at an accelerated speed which is at the maximum when the bearing or roller 4 arrives at the position $b$ or point of greatest leverage of the sprocket, at right angles to the center line $y$, and at a correspondingly diminished speed until it arrives at the point $a'$. Positions $a$ and $a'$ are coincident with the normal center line of the leading-in chain and are equi-distant from the right angle position b, so that as the pivoting joint of each link 5 of the chain is engaged by the sprocket, there is an acceleration for the first half length travel of the link and a corresponding diminution for its last half length travel, in so far as the longitudinal movement of the strand is affected, the links thereafter moving around with the sprocket at the normal rate of movement until released at the other side, when they again assume the strand form. Such point of release, where each joint of the chain straightens out into the return strand, as at $a''$, is substantially the same as the point of engagement $a$ at the other side, and at the minimum leverage, the links at such point reassuming the minimum speed.

In order to compensate for such variable speed, and equalize it for each link engagement, the driving gear 6 of shaft 7 of the sprocket wheels is actuated by a pinion 8 which is so proportioned to gear 6 as to make one revolution to each fractional revolution of the gear corresponding to the pitch movement of the sprocket teeth, and is so geared with its driving wheels as to have a variable compensating speed with relation to the variable speed movement of each link and its pivotal bearing, as, above described.

Thus, in the construction illustrated, the sprocket wheel having eight teeth, pinion 8 is one-eighth the diameter of gear 6 so that in each complete revolution of the pinion the gear is moved through a one-eighth revolution, or through a peripheral distance corresponding in degree of movement to the peripheral pitch travel of the sprocket, as from $a$ to $a'$.

For the purpose of thus transmitting such variable speed movement to pinion 8, its shaft 9 is provided with a gear 10 which is eccentrically mounted on shaft 9 and which meshes into a driving gear 11 which is also eccentrically mounted on its shaft 12. The eccentric mounting of gears 10 and 11 is designed to effect the desired retarded movement of pinion 8 during the first half of its revolution and the accelerated movement thereof during the second half of its revolution, imparting a similar travel to gear 6 and corresponding to each pivotal bearing or roller of the chain through each pitch movement, as above described.

Thus, as shown in Fig. 2, the eccentric mounting of gear 11 with relation to the true center of shaft 12 is at its nearest distance to the center of shaft 9, and the eccentric mounting of gear 10 on shaft 9 is at its farthest distance from shaft 12, on the center line $c$—$c$. By this arrangement I provide an initial engagement of the teeth with the longest leverage of gear 11 engaging the shortest leverage of gear 10, such relations, however, gradually changing during the first half revolution of the gear, or until they arrive at the position shown in Fig. 3, when the leverage of each is just reversed, when the rotative speed of pinion 8 will have been reduced to its minimum speed, corresponding to the half-way position of the link pivot and roller, as shown in Fig. 3. Thereafter, the remaining one-half revolution of gears 11 and 10 effects a gradual speeding up of pinion 8 until at the completion of such half revolution it has again arrived at its maximum speed, again assuming the position shown in Fig. 2, with the next on-coming sprocket tooth in engagement with the next succeeding roller 4. Such operation continues throughout the operation of the mechanism, and continuously compensates for the otherwise present undesired acceleration and retardation of the links for each tooth engagement.

It will be understood, of course, that the proportions of the gears 6 and 8 may be changed dependent on the number of teeth in the sprocket wheel.

While the invention is well adapted to the class of sprocket gearing in which the defects pointed out are to be overcome, it will be understood that it may be applied to any other type of mechanism or apparatus in which similar conditions exist, or that the invention may be variously changed or modified in details of construction, or otherwise, by the skilled mechanic, but all such changes are to be considered as within the scope of the following claims.

What I claim is:—

1. In sprocket gearing, means for retarding the peripheral movement of each tooth of a wheel during one half of its pitch movement and for accelerating its peripheral movement during the other half of its pitch movement corresponding to the accelerated and retarded movement of a chain upon coming into engagement with the wheel, consisting in a sprocket wheel gear and a drive pinion therefor, and means for rotating the pinion at a variable speed conforming to the desired retardation and acceleration of the sprocket wheel.

2. In sprocket gearing, means for steadily and gradually retarding the peripheral movement of the teeth through the first half-pitch travel and for similarly accelerating them through the last half-pitch travel in compensating conformity with the normal acceleration and retardation of the links of a chain in first engagement with the sprocket wheel, consisting in a sprocket wheel gear and a concentrically mounted pinion therefor having a shaft, an eccentrically mounted gear on the pinion shaft, and a similarly mounted gear in engagement therewith.

3. In sprocket gearing, means for retarding the speed of chain links upon engaging a sprocket wheel in passing from a position of minimum distance between the strands to a maximum distance therebetween and for accelerating their speed to a corresponding minimum distance position consisting of a sprocket driving gear and means for actuating it at corresponding speeds throughout each pitch movement of the sprocket wheel.

4. In combination with a sprocket wheel and its driving gear, an actuating pinion engaging the gear having a relative fractional diameter corresponding to the number of teeth in the sprocket wheel, and means for steadily and gradually retarding and accelerating the speed of said pinion during its first and last half revolution respectively.

5. In combination with a sprocket wheel and its driving gear, an actuating pinion engaging the gear operable to rotate the gear and sprocket through a distance corresponding to the peripheral pitch distance between adjacent teeth of the sprocket in one revolution of the pinion, and a pair of eccentrically mounted intermeshing gears in driving connection with the pinion.

6. In combination with a sprocket wheel and its driving gear, an actuating pinion engaging the gear operable to rotate the gear and sprocket through a distance corresponding to the peripheral pitch distance between adjacent teeth of the sprocket in one revolution of the pinion, and a pair of eccentrically mounted intermeshing gears so arranged as to transmit retarded movement to the pinion during one-half of its rotation and accelerated movement thereto during the other half of its rotation.

7. In combination, a sprocket wheel and shaft having a gear, a driving pinion for said gear and a shaft therefor, a gear eccentrically mounted on said shaft, and an eccentrically mounted gear in engagement therewith.

8. In combination, a sprocket wheel and shaft having a gear, a driving pinion for said gear and a shaft therefor, a gear eccentrically mounted on said shaft, a driving shaft having a gear intermeshing therewith and eccentrically mounted thereon in the same relative position as the gear on the pinion shaft.

In testimony whereof I hereunto affix my signature.

CARL L. KENNEY.

Copies of this patent may be obtained for five cents each, by addressing the "Commissioner of Patents, Washington, D. C."